United States Patent Office 2,826,590
Patented Mar. 11, 1958

2,826,590

SYNTHESIS OF TRICYCLAMOL

Edmond M. Bottorff, Shelby County, Ind., assignor to Eli Lilly and Company, Indianapolis, Ind., a corporation of Indiana No Drawing. Application March 22, 1954
Serial No. 417,953

8 Claims. (Cl. 260—326.5)

My invention relates to an improved synthesis of N-(3 - cyclohexyl - 3 - phenyl - 3 - hydroxypropyl) - N - methylpyrrolidinium chloride, a compound sold under the generic name tricyclamol chloride, for use as an antispasmodic agent.

The preparation of the qantities of the above compound required for commercial use is difficult. Published methods employed for the synthesis of compounds of similar type [see Ruddy et al., J. Am. Chem. Soc., 72, 718 (1950), 73, 4096 (1951); Denton et al., J. Am. Chem. Soc., 71, 2054 (1949), 72, 3795 (1950)] are quite unsatisfactory when applied to the synthesis of tricyclamol chloride. The published processes, when applied to the above compound, give rise to difficultly separable by-products which decrease the yield of desired product and make the process for isolating that product more complex. In addition, the published processes require a relatively large number of operations, some of which when applied on a large scale, involve technical difficulties. In consequence of the foregoing, the overall yield of tricyclamol chloride by these methods is substantially below 10%.

It is an object of my invention to provide a process for manufacturing tricyclamol chloride which avoids the shortcomings and defects of the prior art processes as applied to the synthesis of this compound.

My novel process comprises the reaction of a cyclohexyl Grignard reagent with β-chloropropiophenone to produce an intermediate, 1-cyclohexyl-1-phenyl-3-chloropropan-1-ol, which is in turn reacted with N-methylpyrrolidine to yield tricyclamol chloride directly.

It will be noted that the above process is advantageous in that it requires but two process steps, and in that it employs readily available materials in those steps. A further advantage lies in the fact that the intermediate chloropropanol compound need not be isolated but can be converted directly, in the same reaction vessel in which it was produced, into the desired final product.

In carrying out my process, no special precautions are required. The reactions are carried out in an ordinary jacketed still. The Grignard reagent employed may be either cyclohexyl magnesium chloride or cyclohexyl magnesium bromide. As is customary, the Grignard reagent is formed in an ethereal solvent such as diethyl ether, anisole, di-n-butyl ether, dioxane, etc. The reaction between the Grignard reagent and β-chloropropiophenone can be carried out in the same solvent, or the β-chloropropiophenone, prior to addition to the Grignard reagent, can be diluted with another solvent—for example, benzene or its equivalent—which is inert in the presence of a Grignard reagent. Preferably, an actual excess of from 10–20% of the Grignard reagent is employed to provide a maximum yield of the intermediate chloropropanol which is the reaction product.

If desired, the intermediate chloropropanol compound can be isolated, as by decomposition of the Grignard reaction mixture with dilute aqueous acid, followed by separation of the organic layer containing, in solution, the chloropropanol compound, and isolation of the purified material through distillation in vacuo. However, as mentioned above, the intermediate chloropropanol compound need not be isolated, but preferably is converted directly to the final pyrrolidinium compound. In such case, the reaction mixture is decomposed with dilute aqueous acid and the aqueous layer is separated from the organic layer containing the dissolved chloropropanol compound. The organic layer is dried in any suitable manner. For example, if a mixed solvent such as one containing benzene has been employed, drying is most conveniently effected by distilling off a benzene-water azeotrope. N-methylpyrrolidine is then added to the dried solution, the reaction vessel is closed, and the mixture is heated. During the period of heating, the product N-(3 - cyclohexyl - 3 - phenyl - 3 - hydroxypropyl) - N - methylpyrollidinium chloride is formed and separates from solution as an oil which crystallizes on cooling. After the reaction is complete and after cooling, the product is isolated by simple filtration. The product can be further purified by any conventional method.

My invention is further illustrated by the following examples:

Example 1

A Grignard reagent was prepared from 163 g. of cyclohexyl bromide and 24 g. of magnesium turnings, 300 ml. of anisole being used as a solvent therefor. The Grignard reagent solution was cooled to 0° C. and a solution of 84 g. of β-chloropropiophenone in 300 ml. of thiophene-free benzene was added. After the addition had been completed, the reaction mixture was stirred for two more hours at a temperature below 10° C. 150 ml. of concentrated HCl in 150 ml. of water was then added to the reaction mixture in order to decompose the Grignard complexes. The organic layer (about 600 ml.) containing 1 - cyclohexyl - 1 - phenyl-3-chloropropan-1-ol, was separated from the aqueous layer, was washed twice with dilute sodium bicarbonate solution and was then dried over anhydrous sodium sulfate.

200 ml. of the above solution of 1-cyclohexyl-1-phenyl-3-chloropropan-1-ol in a mixture of anisole and benzene, was evaporated in vacuo at a pressure of about 35 mm. (mercury) to remove most of the benzene. 14 g. of N-methylpyrrolidine were added to the residual solution, the reaction vessel was closed, and the mixture was heated at 100° C. for 42 hours. After chilling the solution, an equal volume of acetone was added. Cooling of this solution overnight in an ice box yielded 26.5 g. of crystalline N - (3 - cyclohexyl - 3-phenyl-3-hydroxypropyl)-N-methylpyrrolidinium chloride. Recrystallization of these crystals from 250 ml. of nitroethane yielded 17 g. of material melting at about 159–164° C.; yield=30.5% (based on the use of only part of the solution containing the intermediate chloropropanol).

Example 2

A Grignard reagent was prepared from 118.5 g. of cyclohexyl chloride and 24 g. of magnesium turnings, using 300 ml. of anisole as a solvent. To this Grignard reagent was added a solution of 109 g. of β-chloropiophenone in 300 ml. of benzene. The reaction was carried out substantially as described in Example 1. The final solution of 1-cyclohexyl-1-phenyl-3-chloropropan-1-ol in anisole and benzene was subjected to distillation under reduced pressure. After removing the benzene at 35 mm. (mercury) pressure, the chloropropanol was fractionated through a Vigreux column at 0.5 mm. (mercury) pressure. A fraction boiling at 128–132° C. at a pressure of 0.5 mm. (mercury) contained 108 g. of chloropropanol; yield=48%. $[n]_D^{25°C.}=1.5420$.

Example 3

47 g. of 1-cyclohexyl-1-phenyl-3-chloropropan-1-ol, isolated by distillation as in Example 2, were dissolved in 150 ml. of methyl ethyl ketone and 16 g. of N-methyl-pyrrolidine were added to this solution. The reaction mixture was heated at 100° C. in a stoppered flask for 65 hours. 150 ml. more of methyl ethyl ketone were added, and the mixture was cooled to room temperature. The resulting nearly solid crystalline mass comprising N - (3 - cyclohexyl - 3 - phenyl - 3 - hydroxypropyl) - N-methylpyrrolidinium chloride was filtered. The filter cake was slurried with methyl ethyl ketone and again filtered. 25.5 g. of N-(3-cyclohexyl-3-phenyl-3-hydroxypropyl)-N-methylpyrrolidinium chloride were obtained, which melted indefinitely in the range from 153–163° C.

When 1-cyclohexyl-1-phenyl-3-chloropropan-1-ol is isolated by distillation, as in Example 2, the further reaction of the purified material with N-methylpyrrollidine as in the above example can be carried out in solvents other than anisole or methyl ethyl ketone or mixtures thereof. The more polar solvents such as ketones and ethers are preferred over hydrocarbon solvents. Among those more polar solvents which can be used are benzonitrile and dimethylformamide.

Example 4

A Grignard reagent was prepared from 59 g. of cyclohexyl chloride, and 12 g. of magnesium turnings, using 200 ml. of diethyl ether as a solvent. This solution was cooled to —5° C. and 42 g. of β-chloropropiophenone in 200 ml. of ether added over a two hour period. The reaction mixture was worked up by the method of Example 2, and the fraction boiling at about 135–143° C./.55 mm. (mercury) collected. This fraction weighing about 32 g. consisted substantially of 1-cyclohexyl-1-phenyl-3-chloropropan-1-ol. The chloropropanol was then dissolved in 100 ml. methyl ethyl ketone, 11 ml. of N-methylpyrrolidine were added, and the formation of the quarternary salt carried out by the method of Example 3 except that the heating period was only 24 hours. Recrystallization of the initially obtained crystals plus further crystalline material obtained from the filtrates by concentration and cooling, yielded 15.5 g. of N-(3-cyclohexyl - 3 - phenyl - 3 - hydroxypropyl) - N - methylpyrrolidinium chloride.

I claim:
1. The process which comprises reacting a Grignard reagent chosen from the class consisting of cyclohexyl magnesium chloride and cyclohexyl magnesium bromide with β-chloropropiophenone in an ethereal solvent, reacting the thus-formed 1 - cyclohexyl - 1-phenyl-3-chloropropan-1-ol with N-methylpyrrolidine, and isolating the N - (3 - cyclohexyl - 3 - phenyl - 3 - hydroxypropyl) - N-methylpyrrolidinium chloride formed thereby.
2. The process of claim 1 in which the ethereal solvent is anisole.
3. The process of claim 1 in which the ethereal solvent is diethyl ether.
4. In the process of preparing N - (3-cyclohexyl-3-phenyl - 3 - hydroxypropyl) - N - methylpyrrolidinium chloride, the step which comprises reacting 1-cyclohexyl-1-phenyl-3-chloropropan-1-ol with N-methylpyrrolidine.
5. 1-cyclohexyl-1-phenyl-3-chloropropan-1-ol.
6. The process step which comprises reacting a Grignard reagent chosen from the class consisting of cyclohexyl magnesium bromide and cyclohexyl magnesium chloride with β-chloropropiophenone in an ethereal solvent.
7. The process step of claim 6 in which the ethereal solvent is anisole.
8. The process step of claim 6 in which the ethereal solvent is diethyl ether.

References Cited in the file of this patent

UNITED STATES PATENTS

| | | |
|---|---|---|
| 2,699,444 | Barrett | Aug. 18, 1953 |
| 2,680,115 | Ruddy et al. | June 1, 1954 |
| 2,682,543 | Adamson et al. | June 29, 1954 |

FOREIGN PATENTS

| | | |
|---|---|---|
| 624,118 | Great Britain | May 27, 1949 |
| 627,139 | Great Britain | July 29, 1949 |
| 683,950 | Great Britain | Dec. 10, 1952 |